United States Patent [19]

Ivey

[11] Patent Number: 4,970,946
[45] Date of Patent: Nov. 20, 1990

[54] CORNER VENT FOR WINDSHIELDS
[75] Inventor: Charles H. Ivey, Tulsa, Okla.
[73] Assignee: Aldon Industries, Inc., Bradenton, Fla.
[21] Appl. No.: 482,208
[22] Filed: Feb. 16, 1990
[51] Int. Cl.$^5$ .............................................. B60H 1/30
[52] U.S. Cl. .......................................... 98/2; 98/2.19; 114/211; 296/96.21
[58] Field of Search ................. 98/2, 2.12, 2.13, 2.19, 98/3, 93; 114/211, 2.12; 296/96.11, 96.21

[56] References Cited

U.S. PATENT DOCUMENTS

| 1,136,784 | 4/1915 | Fair | 98/93 X |
| 3,018,784 | 1/1982 | Buxman | 114/211 X |
| 3,090,292 | 5/1983 | Berliner | 98/2.12 |
| 4,856,418 | 8/1989 | Houser | 98/2 |

FOREIGN PATENT DOCUMENTS 642000  8/1928  France ........................ 98/2
1351613  5/1974  United Kingdom ............. 98/2

Primary Examiner—Harold Joyce
Attorney, Agent, or Firm—Duckworth, Allen, Dyer & Doppelt

[57] ABSTRACT

A corner vent for windshields having rearwardly extending panels utilizes a hollow corner post having a concave inner surface with one or more adjustable ventilators therethrough and communicating with the interior of the post. A vent door is formed in an outer convex surface of the post and hingedly attached adjacent a rearward edge of the post. A lever attached to an inside surface of the vent door extends through the inner surface of the post to open and close the vent door. In the closed position, the post gives the appearance of a solid post, and in the open position, air flow is directed into the interior and through the ventilator. The corner vent is applicable to power boats and the like.

17 Claims, 2 Drawing Sheets

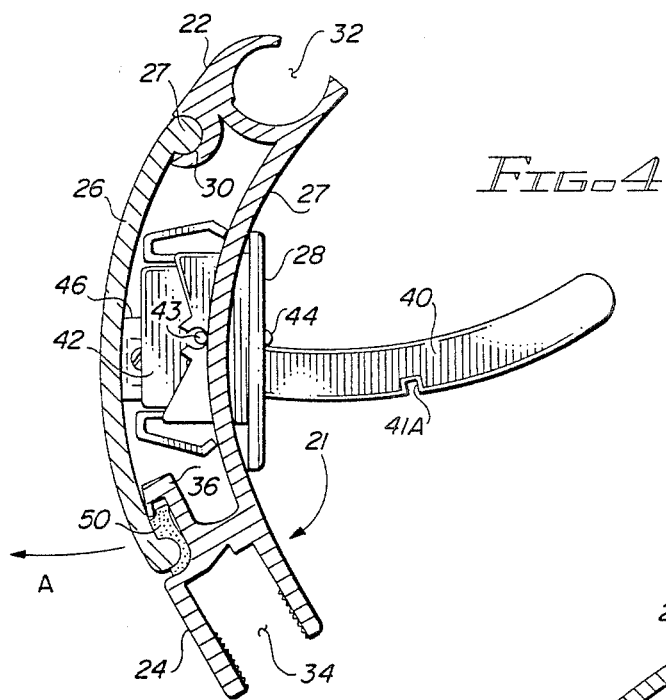
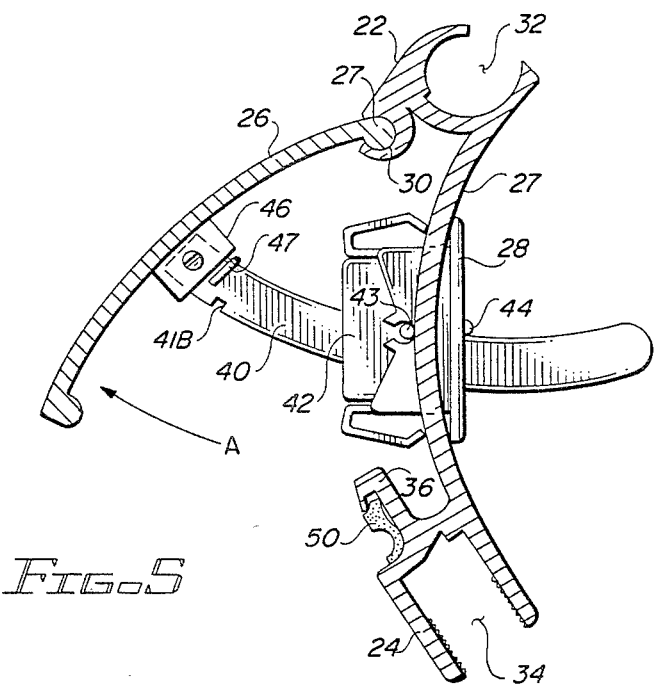
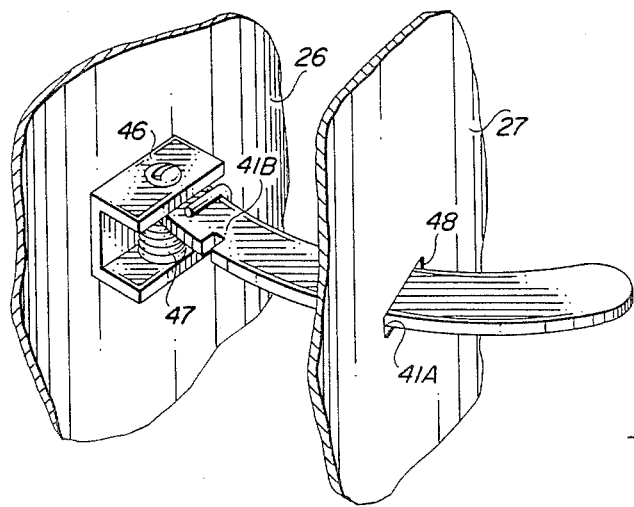

CORNER VENT FOR WINDSHIELDS

FIELD OF THE INVENTION

The present invention relates to windshields, and more particularly to a corner frame element of a windshield having adjustable venting means suitable for boats.

DESCRIPTION OF THE PRIOR ART

Many powered boats have a cockpit area in which the helm and companion seats are located immediately aft of a transparent windshield. The windshield serves to prevent wind, spray and rain from striking the occupants of the cockpit. Although such protection is welcome during adverse weather conditions, it results in discomfort during hot and sunny days. The windshield causes a turbulence in the air passing over the upper edge thereof, and very little cooling air reaches the cockpit. Most prior art windshields wrap around the corners and extended aft of the cockpit, making the supplying of vents difficult or not feasible.

Brock et al, in U.S. Pat. No. 3,093,844 disclose a windshield that slopes aft and includes side sections which effectively block air flow. McGee, in U.S. Pat. No. 2,961,725, shows a similar windshield. Vents for motor cars are known, but appear to be limited to windshields having no side extensions. The following U S. patents disclose various venting devices: Grau, No. 3,368,841; Goetz, No. 4,174,863; and Ingram, No. 4,179,154.

There is a need for an effective venting system for boats that will supply cooling air to the occupants, yet will have a minimum effect on the airflow, and will complement the appearance of modern craft.

SUMMARY OF THE INVENTION

The present invention is an air ventilator for a windshield, such as used on small power boats. The ventilator is incorporated into a corner post of a windshield. The post element of the invention is formed from portions of two elongate aluminum extrusions. A first extrusion is formed as having a laterally curved cross section with edges for receiving a front windshield pane and side extending panes. An inside surface is solid with an open exterior surface.

The second extrusion has a curved lateral cross section, and is formed to fit within the open exterior surface of the first extrusion, thereby providing a hollow corner post. The second extrusion has posterior edge formed into a partial cylinder which is inserted into a cylindrical groove along the posterior edge of the first extrusion. As may be understood, this construction acts as a hinge to permit the second extrusion to pivot from a closed position to an open position, thereby forming a vent door.

The first extrusion is cut to mate with the windshield pane and side extension pane. The second extrusion is preferably slightly shorter than the first extrusion, with a pair of short sections thereof permanently installed at the upper and lower ends of the post element. A plurality of adjustable vent elements, for example, three, is mounted along the interior side of the first extrusion and project into the hollow interior of the post element.

The vent door is provided with a lever attached to the interior surface thereof which extends through an opening in the interior surface of the first extrusion which permits a user to open and close the vent door.

As will now be recognized, the corner post element of the invention permits ventilation of the cockpit area of a craft by opening the vent door, and adjusting the vent elements for a desired amount and direction of air flow. The vent door may be closed when air flow is not required and the post element appears to be a conventional windshield post, thus maintaining the design integrity of the craft.

It is therefore a principal object of the invention to provide a post element of a windshield for a power boat, or the like, which includes an external vent door and adjustable air flow vents, whereby a desired airflow into the boat may be obtained.

It is another object of the invention to provide a post element for a power boat, or the like, that, when closed, appears as a conventional windshield corner post; and, when open, permits airflow into the interior of the craft.

It is still another object of the invention to provide a ventilating post element formed from two metal extrusions.

It is yet another object of the invention to provide a windshield post element having a first extrusion providing mounting for windshield panes, and adjustable vents; and a second metal extrusions for use as an external door.

These and other objects and advantages will become apparent from the following detailed description when read in conjunction with the drawings.

BRIEF DESCRIPTION OF THE DRAWINGS

FIG. 4 is a cross sectional view of the corner post of FIG. 3 in the plane 4—4;

FIG. 5 is a the cross sectional view of FIG. 4 with the vent door shown in an open position; and FIG. 6 is a partial perspective view of the vent door control.

DETAILED DESCRIPTION OF THE PREFERRED EMBODIMENT

Figure 1:
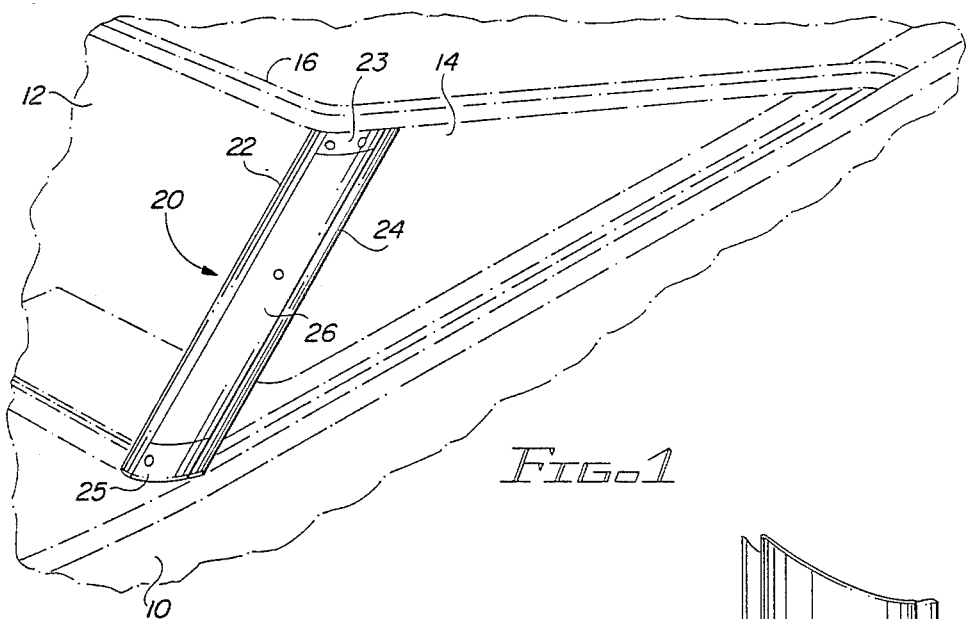
FIG. 1 is a perspective view of a windshield corner post ventilator of the invention shown with a phantom view of a windshield.

Referring to FIG. 1 of the drawings, a portion of a typical power boat 10 is shown in phantom view. Boat 10 has a windshield assembly having a transparent front windshield pane 12 and side wing extension panes 14, with one such wing pane shown. Panes 12 and 14 may include upper and lower edge frames 16. In accordance with the invention, the vertical edges of panes 12 and 14 are joined by a corner post and ventilator shown generally at 20. Post 20 includes an interior portion which includes vertical grooved edges 22 and 24 for receiving respective vertical edges of panes 12 and 14 as shown hereinafter. A hinged outer portion or door 26 covers the exterior portion of post 20. End plates 23 and 25 are fixedly attached to the upper and lower ends, respectively, of the interior portion and serve to maintain door 26 centered in post 20.

Figure 2:
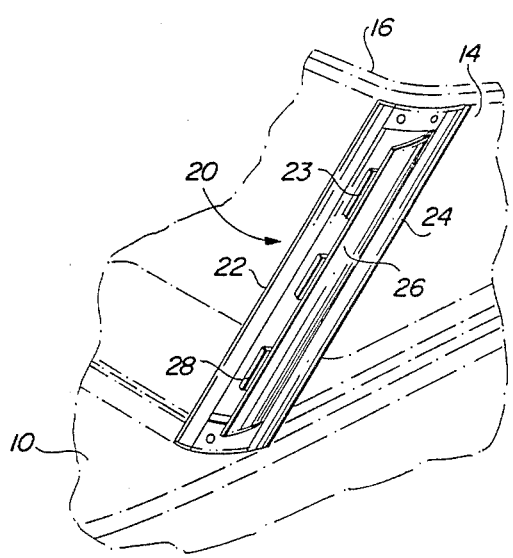
FIG. 2 is the corner post ventilator of FIG. 1 shown with the vent door thereof in an open position.

FIG. 2 illustrates post 20 of FIG. 1 with vent door 26 in an open position. Partially visible in FIG. 2 is a set of adjustable ventilators, shown in more detail hereinafter. As will be recognized, when the craft is in motion, air will be caught by open vent door 26 and directed through ventilators 28 into the cockpit area.

Figure 3:
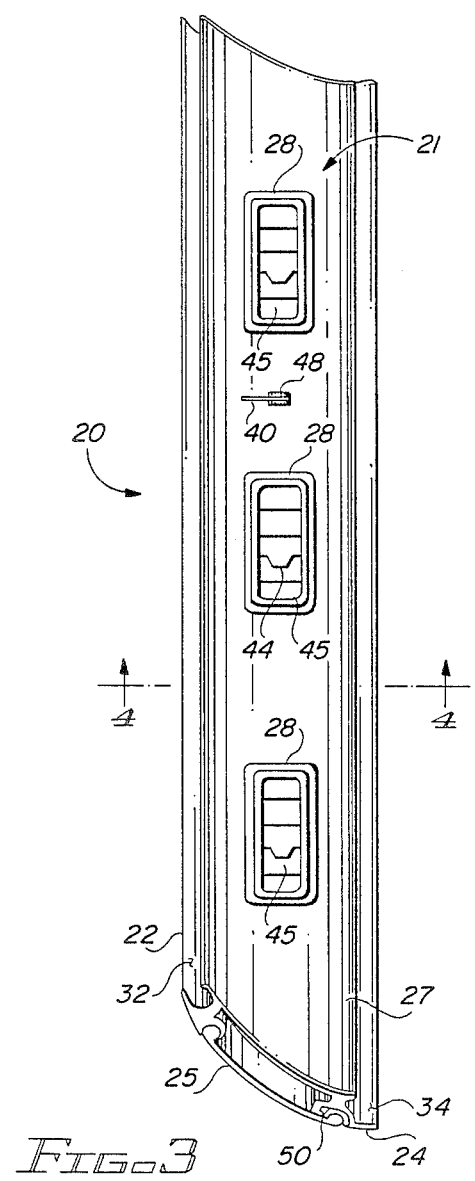
FIG. 3 is a view of the inside surface of the corner post of FIG. 1.

Turning now to FIGS. 3 and 4, details of ventilator post 20 are shown. The interior portion 21 of post 20 includes grooved edge 22 having a groove 32 therealong, grooved edge 24 having groove 34 therealong, and interior surface 27 curved to form the desired corner angle between panes 12 and 14. Advantageously, a single metal or suitable plastic extrusion may be used for interior portion 21. It is preferred to form interior portion 21 from aluminum which may be polished to provide an attractive finish.

As may be noted from the cross sectional view of FIGS. 4 and 5, edge 22 of interior portion 21 includes a hinge boss 30 and edge 24 includes a stop boss 36. Groove 34 accepts pane 12 with suitable weatherstripping (not shown) and groove 32 accepts an extrusion (not shows) attached to an edge of wing pane 14. Vent door 26 is preferably an extrusion and is formed to have a hinge bead 27 along one edge thereof which mates with hinge boss 30. Door 26 is installed in corner 20 by inserting bead 27 into hinge boss 30. A mounting bracket 46 is attached to the interior surface of door 26, and a curved, flat lever 40 is pivoted thereto and extends through a slot 48 of FIG. 3. End plates 23 and 25 are cut from an extrusion used to form vent door 26 and therefore have the same profile. Weatherstrip 50 is inserted the length of stop boss 36 to seal the interior of post 20 when door 26 is closed. Thereafter, hinge bead portions of plates 23 and 25 are inserted into hinge boss 30 of interior portion 21 and each permanently attached to stop boss 36 by screws, rivets, or the like, as shown in FIG. 1, and serve to captivate and center door 26 in hinge boss 30.

With reference to FIGS. 5 and 6, when it is desired to open vent door 26, lever 40 is moved laterally against torsion spring 47 to release notch 41B from slot 48 of surface 27 and pushed outward as indicated by arrow A. Notch 41A engages slot 48 to maintain vent door 26 in the open position as seen in the partial view of FIG. 6.

Shown in FIG. 3, adjustable ventilators 28 are inserted through suitable openings in surface 27. Each ventilator includes a plurality of vanes 45 with one of such vanes having an adjustment tab 44. As is known in the art, vanes 45 are ganged and pivotable such that movement of tab 45 will move vanes 45 to any position between fully open to fully closed. As shown in FIG. 4, a housing 42 in each ventilator 28 holds vanes 45, and is pivoted by pivot 43 to rotate slightly from left to right to permit a user to direct the flow of air as desired.

A ventilating windshield corner post has been disclosed that may be incorporated into any windshield having rearwardly extending side panes. When the vent door is closed, the post has the appearance of a normal solid post, and offers a minimum wind resistance. When open, the vent door acts as an air scoop to direct cooling air through two-way adjustable ventilators. Although the invention is particularly applicable to power boats, it may be incorporated into other "top-down" type vehicles such as convertible automobiles. In the preferred embodiment, the post requires only two extrusions, and therefore can be manufactured economically, and with a minimum of labor.

Although a specific embodiment has been disclosed for exemplary purposes, many variations in the appearance and details of construction may be made without departing from the spirit and scope of the invention.

I claim:

1. A ventilating corner post for supporting an outer edge of a transparent windshield comprising:
   a hollow post, formed along a forward edge thereof to accept said outer edge of said transparent windshield;
   a vent door formed as an outer surface of said post and hinged thereto adjacent a rearward edge of said post;
   said post having an inner surface thereof, said inner surface having at least one ventilator mounted therethrough and communicating with an interior region of said post; and
   means for selectively opening and closing said vent door whereby said door, when open, directs air flow into said interior region, and through said ventilator.

2. The post as defined in claim 1 in which said rearward edge is formed to accept rearwardly extending side panels.

3. The post as defined in claim 1 in which: said inner surface, forward edge, and rearward edge of said post are formed by a first extrusion; and
   said vent door is formed by a second extrusion.

4. The post as defined in claim 3 in which said vent door is hinged by a hinge bead formed along one edge of said second extrusion disposed in a hinge boss formed in said first extrusion.

5. The post as defined in claim 1 in which said opening and closing means includes a lever pivotally attached to an inner surface of said vent door, said lever projecting through an opening in said inner surface of said post.

6. The post as defined in claim 5 in which said lever includes a first notch for engaging said inner surface at an edge of said opening therethrough to maintain said vent door in a closed position, and a second notch for engaging said inner surface at said edge of said opening to maintain said vent door in an open position.

7. The post as defined in claim 6 which further includes spring means for biasing said lever toward said edge of said opening.

8. The post as defined in claim 3 in which said first and second extrusions are formed from aluminum.

9. The post as defined in claim 3 in which said first and second extrusions are formed from plastic.

10. In a windshield having rearwardly extending side panels, a ventilating post for joining a side panel and said windshield comprising:
    a first extrusion for forming an essentially concave inner surface of said post, and having a forward edge formed to accept an edge of said windshield, and a rearward edge formed to accept said side panel;
    a second extrusion for forming an essentially convex vent door, said extrusion hingedly attached adjacent said rearward edge of said first extrusion, and spanning to engage said first extrusion adjacent to said forward edge thereby forming a hollow structure;
    at least one ventilator element disposed through said inner surface of said first extrusion and communicating with an interior of said hollow structure; and
    lever means for selectively opening and closing said vent door whereby said vent door, when open, directs air flow into said interior and through said ventilator.

11. The post as defined in claim 10 in which said ventilator element includes;

a plurality of adjustable horizontal vanes; and
means for rotating said plurality of vanes about a vertical axis.

12. The post as defined in claim 10 in which said lever means includes a lever pivotally attached to an inner surface of said vent door, said lever projecting through an opening in said concave inner surface of said post.

13. The post as defined in claim 12 in which said lever includes a first notch for engaging said inner surface at an edge of said opening therethrough to maintain said vent door in a closed position, and a second notch for engaging said inner surface at said edge of said opening to maintain said vent door in an open position.

14. The post as defined in claim 12 which further includes spring means for biasing said lever toward said edge of said opening.

15. The post as defined in claim 10 in which said vent door is hingedly attached to said first extrusion by a hinge bead formed along one edge of said second extrusion disposed in a hinge boss formed in said first extrusion.

16. The post as defined in claim 10 in which said first and second extrusions are formed of aluminum.

17. The post as defined in claim 10 in which said first and second extrusions are formed of plastic.

* * * * *